United States Patent [19]
Iceland

[11] 3,775,582
[45] Nov. 27, 1973

[54] PROXIMITY CONTROL USING MICROWAVE TECHNIQUES
[75] Inventor: William F. Iceland, Los Alamitos, Calif.
[73] Assignee: North American Rockwell Corporation, El Segundo, Calif.
[22] Filed: Dec. 9, 1971
[21] Appl. No.: 206,462

[52] U.S. Cl............ 219/125 PL, 219/124, 318/640
[51] Int. Cl.............................................. B23k 9/12
[58] Field of Search........................219/124–126, 219/125 PL, 60, 61, 137; 318/640

[56] References Cited
UNITED STATES PATENTS

| | | | |
|---|---|---|---|
| 3,426,175 | 2/1969 | Hahne............................ | 219/125 R |
| 3,634,682 | 1/1972 | Gold.................................. | 318/640 |
| 3,048,692 | 8/1962 | Bichsel et al.................... | 219/131 F |
| 3,370,151 | 2/1968 | Normando...................... | 219/131 R |

OTHER PUBLICATIONS
London, Laser Interferometer, Instruments and Control Systems, Nov., 1964, pp. 87–89.

*Primary Examiner*—J. V. Truhe
*Assistant Examiner*—L. A. Schutzman
*Attorney*—L. Lee Humphries et al.

[57] ABSTRACT

A system is disclosed combining an arc welder having an electrode with an electromagnetic wave source including an antenna and an interferometer wherein the electromagnetic waves are reflected off the surface of the welding workpiece and the reflected waves are phase matched with the incident waves to produce a signal whose amplitude is related to the spacing between the surface of the workpiece and the antenna. This signal is used to drive a motor to move the electrode and the antenna in unison to maintain the required spacing.

8 Claims, 5 Drawing Figures

PROXIMITY CONTROL USING MICROWAVE TECHNIQUES

FIELD OF THE INVENTION

This invention relates to an apparatus for controlling the spacing between the welding means of the welder and the surface of the workpiece which is to be welded.

BACKGROUND OF THE INVENTION

To produce a good weld, the welding means or the means that applies heat should be maintained at a constant distance from the workpiece as the weld arc is moved thereacross. Heretofore, the control of this distance was, for example, (a) by mechanical means such as a guide roller that runs along the surface to support the welding means, (b) by optical means such as detecting the illuminosity of the weld beam, (c) by electronic means such as sensing the changes in a capacitance probe near the workpiece, or (d) by magnetic means such as detecting changes in magnetic field about a pickup coil. Although prior art means can control the distance satisfactorily for heavier gauge material, in most instances they were not quite accurate enough to give reliable results when used on thin, highly reactive or refractory metals. Heretofore, weld joints on this type of metal required non-destructive testing before the reliability of the weld could be accurately ascertained.

OBJECTS OF THE INVENTION

An object of this invention is to provide a means to maintain the required distance or spacing between a welding means and a workpiece to a high degree of precision and reliability.

Another object is to provide means using electromagnetic energy for measuring and maintaining the arc length constant as a weld arc moves along the surface of the workpiece.

Another object is to provide a constant arc length to a high degree of precision even with a consumable electrode.

Another object of this invention is to use electromagnetic energy to accurately track a weld joint with a welding arc.

These and other objects and features of advantage of this invention will become more apparent after studying the following description of the preferred embodiment of the invention together with the drawings.

DETAILED DESCRIPTION OF THE DRAWINGS

Figure 1:
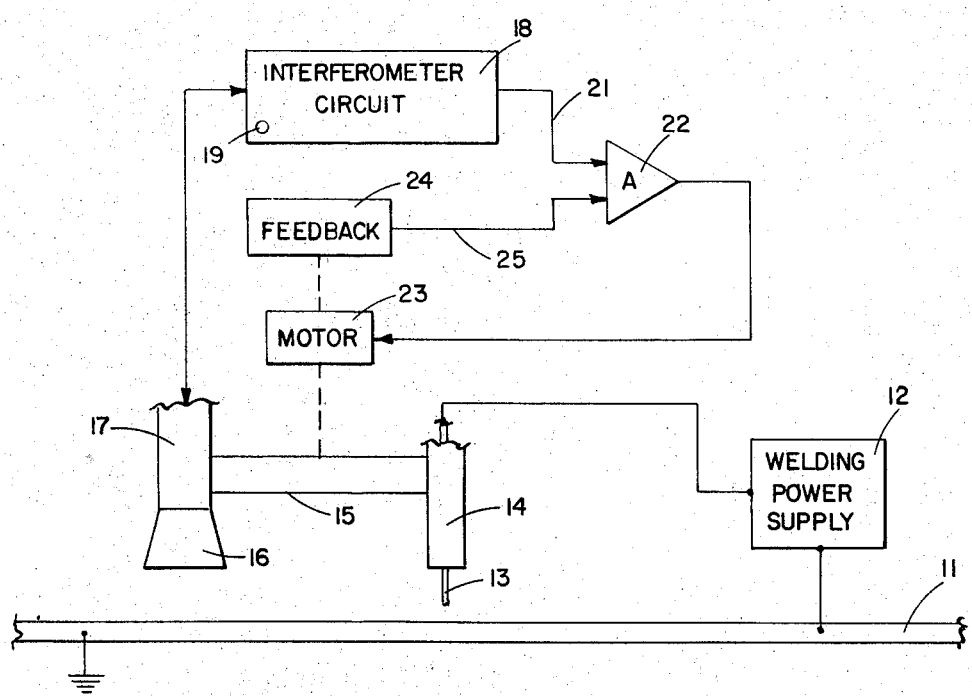
FIG. 1 schematically shows one embodiment of the invention as used with a non-consumable electrode FIG. 2 schematically shows another embodiment of the invention as used with consumable electrode FIG. 3 schematically shows another embodiment of the invention as used to track a weld seam

In FIG. 1 the workpiece or item to be welded is represented by the numeral 11 which is coupled to one lead of a welding electric power supply 12, preferably a direct current source. The other lead from the power supply is connected to a welding electrode 13 and, in this embodiment, is shown as a non-consumable type electrode. Electrode 13 is surrounded by a standard tubular cup 14 that carries inert gas to surround the weld zone. The electrode 13 and cup 14 assembly is conventional in the art and is representative of the welding means. Electrode 13 and cup 14 assembly is fixed by a strut 15 to an energy source of electromagnetic waves, such as a microwave antenna horn 16 that is attached to the end of a rectangular waveguide 17. The horn 16 opens towards the workpiece 11 to direct incident microwaves thereto and to receive the reflected microwaves. The incident microwaves are supplied by interferometer circuit 18 which could be of the type described in a co-pending United States patent application, Ser. No. 17,547, filed on Mar. 9, 1970, now U.S. Pat. No. 3,634,756 issued on Jan. 11, 1972 having the same assignee as this application. The circuit 18 has a knob 19 which, when turned, sets the distance between the electrode 13 and the workpiece 11. The function of interferometer circuit 18, as taught in application No. 17,547, is to compare the phase angle of the incident microwaves to the phase angle of the reflected microwaves and produces a voltage signal on output lead 21. The amplitude and sign of the signal indicate how far and in what direction the difference between the phase angles has shifted from a selected value. This signal is amplified by an amplifier 22 and fed to a motor 23 which moves the antenna horn 16 and electrode 13 and cup 14 assembly in a direction to produce a null on lead 21. In addition, the motor 23 drives feedback circuit 24 which develops a voltage that is indicative of the relative position of the antenna. This voltage is also fed to the amplifier 22 by a lead 25 to inhibit hunting within the system. This feedback feature is well known in the art and forms no part of this invention. To increase the accuracy of the system, the microwaves are focused to a small spot on the surface of the workpiece 11 by a suitable lens (not shown) disposed within the horn in a standard manner. This allows the horn 16 to be spaced from the workpiece at a relatively large distance.

Figure 2:
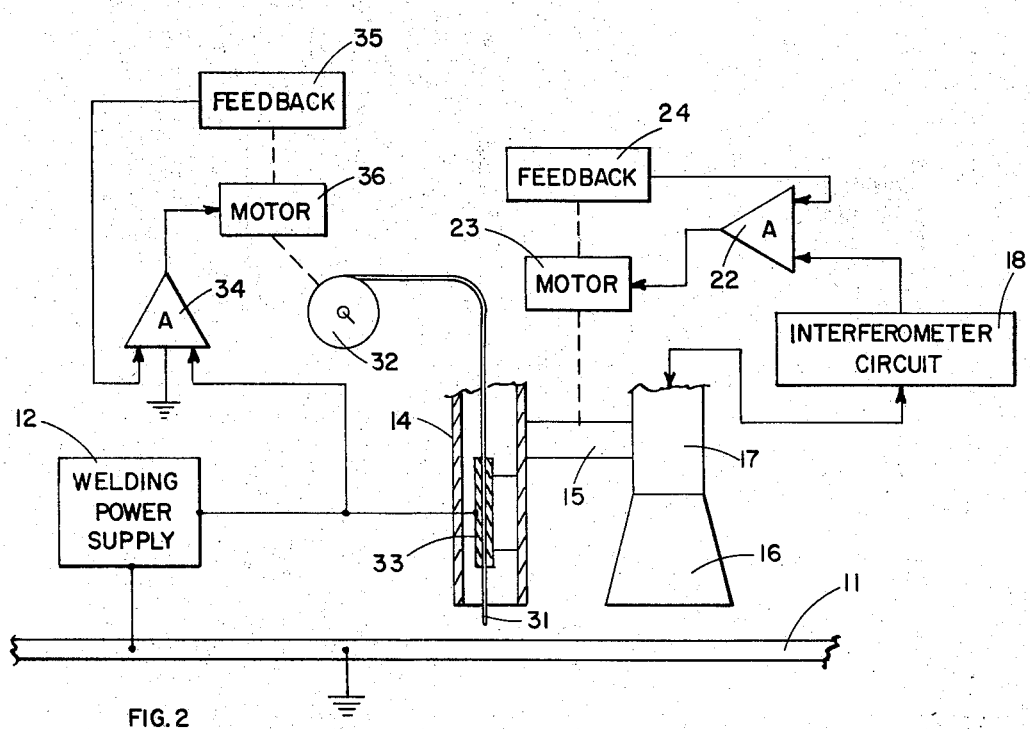

With a slight modification, the novel features of this invention are useful when welding with a consumable electrode. Referring to FIG. 2, the schematic sketch shows the invention incorporated with a consumable electrode 31 that is fed from a suitably disposed spool 32. The electrode 31 passes through the welding cup 14 which, like in FIG. 1, is fixed to the antenna horn 16 and waveguide 17 by the strut 15. The elements in FIG. 2, having the same numeral designation as the elements in FIG. 1, perform substantially the same function. One understands that, since the electrode 31 is being consumed, the arc length would increase unless the electrode is fed from the spool 32 into the arc region. The features of this invention are used to accurately maintain a constant spacing between a cup 14 and workpiece 11. As one skilled in the art knows, the resistance across the arc is substantially constant. However, the resistance across the workpiece and a low resistance contact sleeve 33, which couples current from the supply 12 to the electrode 31, which resistance includes the resistance of the arc, is determined primarily by the resistance of the portion of the electrode 31 extending from the sleeve 33. Therefore, because the spacing of the sleeve 33 from the workpiece 11 is constant and if the welding power supply 12 has a drooping characteristic, i.e., the voltage drops as the current supplied increases, the voltage drop across the workpiece and sleeve 33 would be related to the arc length. This voltage drop is coupled to another amplifier 34 together with a feedback signal from circuit 35. The output of the amplifier 34 is used to drive the motor 36 at such a speed to maintain a constant voltage drop. One understands that, if the cup 14 was not maintained at a constant spacing on the workpiece 11, the resistance of the length of electrode 31, extending out from the sleeve 33 towards the workpiece 11, would greatly effect the the whole resistance being monitored by the amplifier 34. The amplifier 34 could be provided with a gain control so that one could control the arc length to obtain the optimum arc length required.

Figure 3:
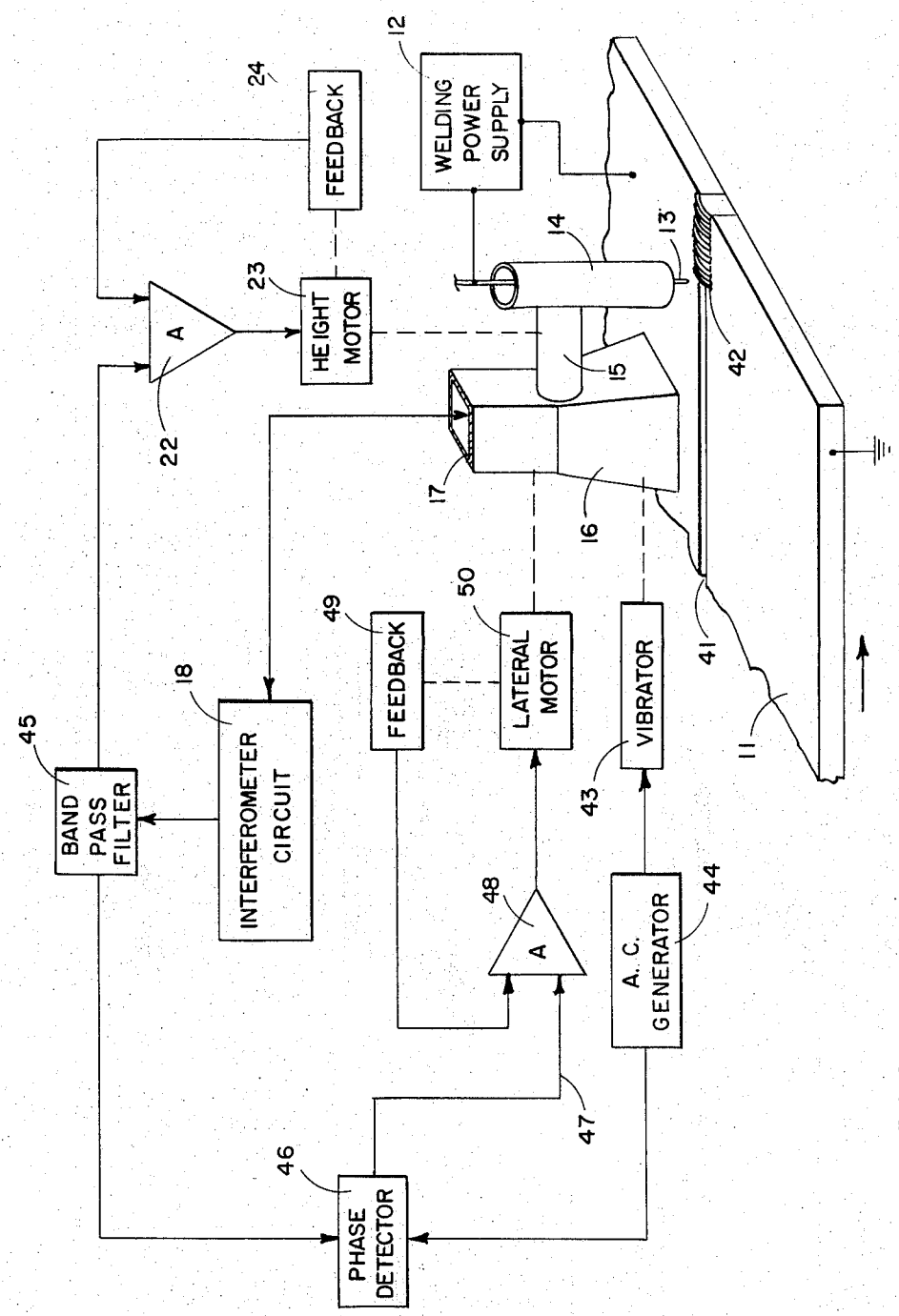

Since the electromagnetic waves emanating from the antenna horn 16 could be focused down to a small spot by conventional means, the features herein could be used to track a weld-seam automatically. Referring to FIG. 3, as before, like elements having the same reference numerals, the workpiece 11 is shown, pictorially, to make a butt seam 41, therein, visible to the viewer. At the right of the drawing, the seam 41 is shown filled with weld metal 42. In this embodiment, the nonconsumable electrode 13 is shown so as not to complicate the figure with additional controls for feeding the consumable electrode 31. To track the seam 41, the antenna horn 16 is oscillated back and forth across the seam by suitable means, for example, a suitable mechanical vibrator 43, preferably vibrating within the ultrasonic region and which is driven by a suitable alternating current generator 44. The ultrasonic region is preferred as it eliminates unnecessary noise and the frequency is above the response frequency of the height servo system (which was described in conjunction with FIG. 1). However, one could employ non-mechanical means to oscillate the focused spot. The output of the interferometer circuit 18 is first fed into a band pass filter 45 so that the higher frequencies indicating the horizontal vibrations formed by vibrator 43 are coupled to a phase detector 46 while the lower frequencies, representative of the height, are coupled to the amplifier 22. The phase detector 46 has coupled thereto the generator 44 so that the detector 46 can detect the phase relationship between the two inputs thereto. The detector 46 produces on output lead 47, as will be explained hereinafter, a steady signal of one polarity when both inputs are in-phase and a steady signal of another polarity when both inputs are 180° out-of-phase. Output lead 47 is coupled to an amplifier 48 together with the output from a feedback circuit 49 to drive a motor 50 which moves the waveguide and antenna horn laterally in the direction to null the signal on output lead 47.

Figure 4:
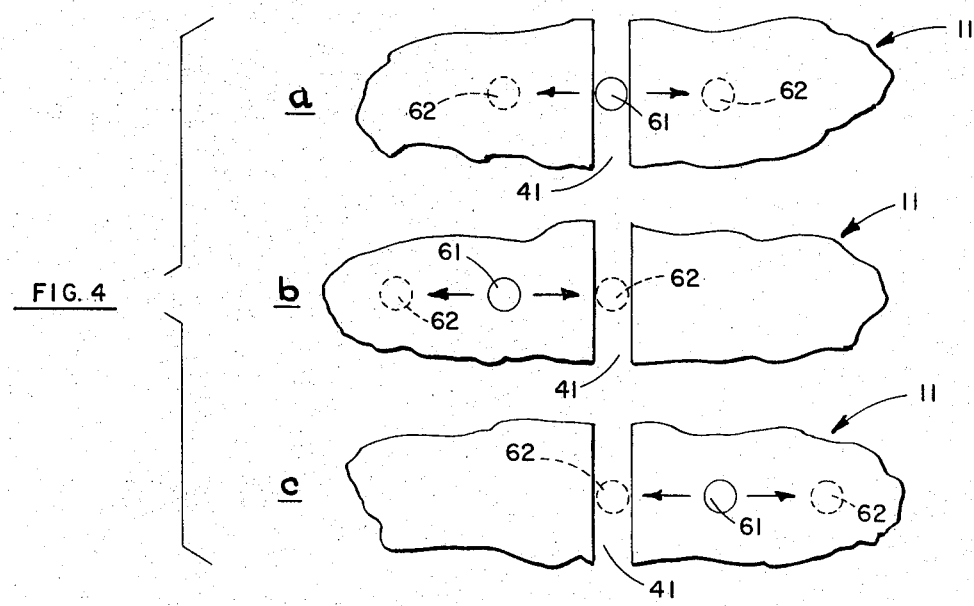
FIG. 4a, 4b, 4c show the relative position of the microwave spot relative to a seam to be welded when the spot is on the seam, to the right thereof and to the left thereof, respectively

Referring to FIGS. 4a, 4b, and 4c, the manner of how the seam tracking feature operates will be explained. The electromagnetic waves, as said before, are focused to a spot as shown by circle 61. The circle 61 is, preferably, smaller than a width of the seam 41. FIG. 4a shows the circle 61 when the system is on the seam; FIG. 4b shows when the system is to the left of the seam; and FIG. 4c shows when the system is to the right of the seam. The dotted circle 62 shows when the focused wave spot is at the extreme of its vibration path while the circle 61 shows the focus wave spots at the center of the vibrating path.

Figure 5:
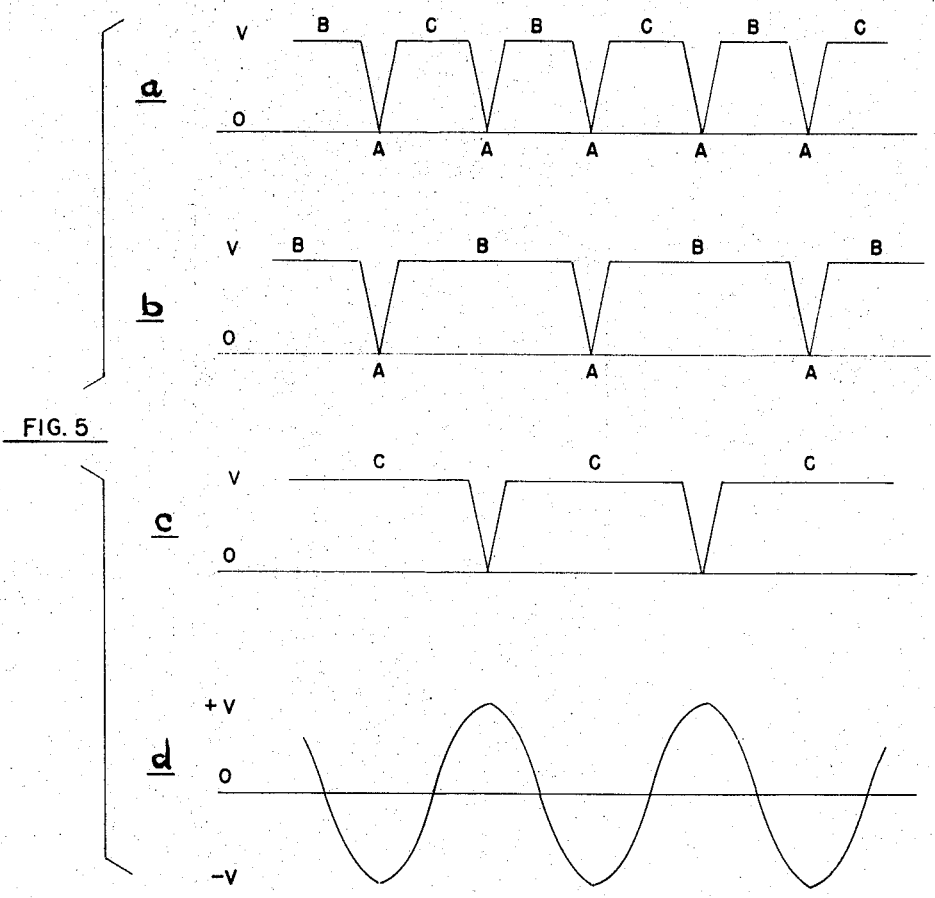
FIG. 5a, 5b, and 5c show the time history of the response of the detector circuit used in FIG. 3 when the spot is on seam, off to the left and off to the right of the seam, respectively
FIG. 5d is a time history of the reference alternating signal.

As shown in FIG. 5a, in a system which is on the seam, no waves are reflected back to the antenna 16 when the wave spot crosses the seam, but when the spot is on either side, waves are reflected back into the antenna. Thus, points A on the axis of abscissas indicate when the spot is within the seam, points B indicate when the spot is to the left of the seam, points C indicate when the spot is to the right of the seam. FIG. 5d shows the time history of the output of generator 44 and one can readily compare the phase relations between the respective curves in FIGS. 5a, 5b, 5c, and 5d. Therefore, when the system is on the seam, the frequency of the signal from the band pass filter 45 is twice the frequency of the signal from the generator 44 and a null (no signal) appears on lead 47. Now, when the system moves to the left whereby the right extreme of vibrating amplitude is over the seam 41, as shown in FIGS. 4b, points C on the curve disappear, as shown in FIG. 5b, and the frequency of the signal from the band pass filter 45 is the same as the frequency of the signal from generator 44, and in phase therewith, as one sees by comparing the curves of 5b and 5d. Now, when the system moves to the right, whereby the left extreme of vibrating amplitude is over the seam 41 as shown in FIG. 4c, points B on the curve disappear, as shown in FIG. 5c, and the frequency of this signal from the band pass filter 45 is again the same as the frequency of the signal from the generator 44 and is out of phase therewith as one sees by comparing the curves of FIG. 5c and 5d. The phase detector, in a standard manner, can produce the signal to actuate lateral motor 50 to bring the system on the seam.

Although the preferred embodiments of the invention are shown one skilled in the art, after studying the foregoing, could devise various other embodiments to perform the same functions. Therefore, the invention is not limited to specific described embodiment but to all embodiments which are within the scope of the inventive claims.

What is claimed is:

1. An apparatus for maintaining constant spacing between a welding electrode and a workpiece to be welded, said apparatus comprising:

welding means having an electrode spaced from the workpiece, means operatively connected to said welding means for moving it towards and away from the workpiece, microwave interferometer means operatively connected to said welding means for setting up a standing electromagnetic wave including an interferometer and an antenna fixed to said welding means for radiating electromagnetic waves toward the surface of the workpiece and receiving back reflected electromagnetic waves, said antenna comprising means coupled to said interferometer whereby any change in phase difference between said radiated and reflected electromagnetic waves will produce a first electrical signal proportional to the change in spacing between said welding means and the workpiece, and means for coupling said first signal to said moving means to move said welding means in a direction to nullify the change in the voltage signal and maintain a constant spacing between the welding means and the workpiece.

2. The apparatus of claim 1 wherein said electrode is of the non-consumable type.

3. The apparatus of Claim 1 wherein said welding means includes:
a tubular cup for conducting inert gas to the weld,
a consumable electrode passing through said cup,
means within said cup for supporting said electrode and coupling electric welding current thereto to form a welding arc,
said antenna being operatively fixed to said cup whereby said means for moving said welding means maintains the spacing between said cup and workpiece constant,
means for monitoring the resistance between said electrode supporting means and said workpiece, and
means responsive to said resistance monitoring means for feeding said consumable electrode into the arc to maintain a constant arc length.

4. The apparatus of claim 1 wherein:
focusing means are provided to focus said electromagnetic waves to a small spot on said workpiece,
said workpiece includes two members disposed side by side forming a butt joint,
means are provided for oscillating said spot back and forth on said workpiece laterally across said joint,
means for adjustably moving said welding means laterally across said joint,
means for detecting and comparing the frequency and phase relationship of the waves reflected from said workpiece with the frequency and phase relationship of said spot moving means to produce a signal indicating when the frequencies are in-phase and out-of-phase and when the reflected wave frequency is twice the frequency of said spot moving means, and
said means for adjustably moving said welding means being responsive to said signal to maintain the electrode over said joint.

5. The apparatus of Claim 3 wherein:
focusing means are provided to focus said electromagnetic waves to a small spot on said workpiece,
said workpiece includes two members disposed side by side forming a butt joint,
means are provided for oscillating said spot back and forth on said workpiece laterally across said joint,
means for adjustably moving said welding means laterally across said joint,
means for detecting and comparing the frequency and phase relationship of the waves reflected from said workpiece with the frequency and phase relationship of said spot moving means to produce a signal indicating when the frequencies are in-phase and out-of-phase and when the reflected wave frequency is twice the frequency of said spot moving means, and
said means for adjustably moving said welding means being responsive to said signal to maintain the electrode over said joint.

6. The apparatus of claim 4 wherein said electrode is of the non-consumable type.

7. An apparatus for maintaining constant spacing between a welding means and a workpiece to be welded, said apparatus comprising:
an interferometer having means for providing a source of incident electromagnetic waves,
an antenna means fixed to said welding means, directed towards said workpiece and coupled to said interferometer to cause the incident electromagnetic waves to radiate towards said surface and to receive reflected electromagnetic waves so that the reflected waves can be coupled back to said interferometer,
means for focusing said electromagnetic waves to a small spot on said workpiece,
said workpiece including two members disposed side by side to form a butt joint,
means for oscillating said spot back and forth on said workpiece across said joint at a given frequency,
means for moving said welding means laterally across said joint, and
means coupled to said interferometer and to said spot moving means for detecting and comparing the frequency and phase relationship of the waves reflected from said workpiece with the frequency and phase relationship of said spot moving means to produce a signal indicating when the frequencies are in-phase and out-of-phase and when the reflected wave frequency is twice the frequency of said spot moving means,
said means for moving said welding means responsive to said signal to maintain the electrode tracking along said joint.

8. The apparatus of claim 7 further comprising:
a tubular cup for conducting inert gas to the weld,
a consumable electrode passing through said cup,
means within said cup for supporting said electrode and coupling electric welding current thereto to form a welding arc,
means including said antenna means fixed to said cup and including said interferometer for maintaining the spacing between said cup and said workpiece constant,
means for monitoring the resistance between said electrode supporting means and said workpiece, and
means responsive to said resistance monitoring means for feeding said consumable electrode into the arc to maintain a constant arc length.

* * * * *